(12) United States Patent
Kim et al.

(10) Patent No.: US 9,372,294 B2
(45) Date of Patent: Jun. 21, 2016

(54) CARBON NANOTUBE SHEET AND POLARIZER USING SAME

(75) Inventors: Dia Sik Kim, Seoul (KR); Hyeong Ryeol Park, Seoul (KR); Ji Soo Kyoung, Seoul (KR); Yong Hyup Kim, Seoul (KR); Eui Yun Jang, Jeju-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 14/128,245

(22) PCT Filed: Jun. 22, 2012

(86) PCT No.: PCT/KR2012/004958
§ 371 (c)(1),
(2), (4) Date: Dec. 20, 2013

(87) PCT Pub. No.: WO2012/177082
PCT Pub. Date: Dec. 27, 2012

(65) Prior Publication Data
US 2014/0153094 A1 Jun. 5, 2014

(30) Foreign Application Priority Data
Jun. 22, 2011 (KR) .................. 10-2011-0060872

(51) Int. Cl.
*G02B 5/30* (2006.01)
*B82Y 20/00* (2011.01)

(52) U.S. Cl.
CPC . *G02B 5/30* (2013.01); *B82Y 20/00* (2013.01); *G02B 2207/101* (2013.01); *Y10T 428/30* (2015.01)

(58) Field of Classification Search
CPC ...... G02B 5/30; G02B 5/3025; G02B 5/3041; G02B 5/3058; G02B 2207/101; B82B 1/00; B82B 1/001; B82B 3/00; B82B 3/0061; B82B 3/0066; B82B 1/008; B82Y 20/00; B82Y 30/00; B82Y 35/00; B82Y 40/00; B82Y 99/00; C01B 31/02; C01B 31/0206; C01B 31/0213; C01B 31/022; C01B 31/0266; C01B 31/0273; C01B 2202/00; C01B 2202/02; C01B 2202/08; C01B 2202/22; C01B 31/028
USPC ............. 359/352, 483.01–494.01; 427/163.1; 977/734, 742, 751, 832, 834, 840, 849, 977/855, 858, 952, 842–848, 949–950; 264/82; 425/75
See application file for complete search history.

(56) References Cited

U.S. PATENT DOCUMENTS 7,054,064 B2 5/2006 Jiang et al.
8,193,692 B2 6/2012 Lee et al.
(Continued)

FOREIGN PATENT DOCUMENTS

KR 10-2010-0084434 A 7/2010

OTHER PUBLICATIONS

Ren et al., "Carbon Nanotube Terahertz Polarizer," Nano Letters, vol. 9, No. 7, Jun. 3, 2009, pp. 2610-2613.*
(Continued)

*Primary Examiner* — Derek S Chapel
*Assistant Examiner* — Adam W Booher
(74) *Attorney, Agent, or Firm* — Sughrue Mion, PLLC

(57) ABSTRACT

The present invention relates to a carbon nanotube sheet, and to a polarizer using same. More particularly, the present invention relates to a carbon nanotube sheet, and to a polarizer using same, the carbon nanotube sheet comprising: a substrate; and a carbon nanotube layer derived from a carbon nanotube forest and wound on the substrate, wherein the carbon nanotube layer is composed of 5 or more layers.

18 Claims, 7 Drawing Sheets

(56) References Cited

U.S. PATENT DOCUMENTS

2008/0018012 A1* 1/2008 Lemaire et al. .............. 264/82
2008/0198453 A1  8/2008 LaFontaine et al.

OTHER PUBLICATIONS

Zhang et al., "Strong, Transparent, Multifunctional, Carbon Nanotube Sheets," Science, vol. 309, Aug. 19, 2005, pp. 1215-1219.*

Kyoung et al., "A Reel-Wound Carbon Nanotube Polarizer for Terahertz Frequencies," Nano Letters, vol. 11, Aug. 23, 2011, pp. 4227-4231.*

Merriam-Webster Dictionary, Definitions of "Substrate" and "Substratum," www.merriam-webster.com, accessed Nov. 5, 2015.*

Lee et al., KR20100084434, Jul. 26, 2010, English Machine Translation created Nov. 5, 2015.*

* cited by examiner

CARBON NANOTUBE SHEET AND POLARIZER USING SAME

CROSS REFERENCE TO RELATED APPLICATIONS

This application is a National Stage of International Application No. PCT/KR2012/004958, filed on Jun. 22, 2012, which claims priority from Korean Patent Application No. 10-2011-0060872, filed on Jun. 22, 2011, the contents of all of which are incorporated herein by reference in their entirety.

TECHNICAL FIELD

The present invention relates to a carbon nanotube sheet and a polarizer using the same. More particularly, the present invention relates to a carbon nanotube sheet composed of multi-wall carbon nanotubes and a polarizer using the same.

BACKGROUND ART

Carbon nanotubes have similar electrical conductivity to copper, have the same thermal conductivity as diamond (diamond's thermal conductivity is the best in natural world) and have 100 times higher strength than steel. Therefore, carbon nanotubes have attracted considerable attention as raw materials to be used for next-generation electronic devices, photoelectronic devices and circuits and the like.

Further, carbon nanotubes are made into a quasi-one-dimensional system because of high electrical and optical anisotropy that results from their large aspect ratios and small diameters. On the basis of this electrical and optical anisotropy, various recent efforts have been made to use carbon nanotube sheets as linear polarizers in a visible frequency range as well as in a long-wavelength range.

Meanwhile, a polarizer is an optical device for selectively transmitting linearly-polarized light in a predetermined direction from irregularly-mixed polarized light. That is, a polarizer serves to selectively absorb or refract linearly-polarized light in one direction to transmit only linear polarized light perpendicular to the direction. Here, the direction in which linearly-polarized light is transmitted is referred to as "a polarizing axis". An ideal polarizer transmits all the components of a polarizing axis and blocks the components perpendicular to the polarizing axis.

As a transitional terahertz (THz) polarizer, a wire grid polarizer has dominated a polarizer market. A wire grid polarizer may be fabricated by mechanically winding a wire under high tension on a frame. Such a wire grid polarizer guarantees a low light loss and minimum light dispersion because it does not need a substrate. One of the factors necessary for fabricating the wire grid polarizer is winding tension. In the fabrication of the wire grid polarizer, it is important to uniformly maintain the diameters of metal wires and the intervals between metal wires. However, it is impossible to realize such conditions, and each independent metal wire assembly of this wire grid polarizer is often cut because the strength of metal wires is very low. Further, when the wire grid polarizer is exposed to air, the metal wire is rapidly oxidized, thus decreasing the lifespan of the wire grid polarizer. Meanwhile, the wire grid polarizer is not suitable to be used in a high terahertz frequency range because the conductivity of each wire is limited and the interval between wires must be smaller than the wavelength of incident beam to an extinction ratio.

In order to overcome the above problems, there was proposed a method of fabricating a wire grid polarizer by forming a wire grid on a substrate. The wire grid polarizer fabricated using this method is relatively strong and operates in a high terahertz frequency range because elaborate pitches can be made thanks to recently-developed nano-patterning technologies. Nevertheless, the substrate basically incurs the lows of light and the dispersion of incident waves, and the nano-patterning technologies require a time-consuming process.

Thus, a polarizer using carbon nanotubes has been proposed. However, this polarizer using carbon nanotubes is also problematic in that it exhibits a lower extinction ratio than a different type of polarizer such as a wire grid polarizer or a liquid crystal polarizer. Therefore, a means for solving the problem is eagerly required.

DISCLOSURE

Technical Problem

In order to solve the above-mentioned problems, the present invention intends to provide a carbon nanotube sheet including carbon nanotubes as a main material, and a polarizer using the same.

Further, the present invention intends to provide a carbon nanotube capable of exhibiting polarization performance in a terahertz frequency range, and a polarizer using the same.

Further, the present invention intends to provide a carbon nanotube sheet having an improved extinction ratio, and a polarizer using the same.

Further, the present invention intends to provide a carbon nanotube sheet which can be easily fabricated without chemical treatment such as etching or the like, and a polarizer using the same.

Technical Solution

An aspect of the present invention provides a carbon nanotube sheet, including: a substrate; and a carbon nanotube layer derived from a carbon nanotube forest and wound on the substrate, wherein the carbon nanotube layer is composed of 5 or more layers.

In the carbon nanotube sheet, the carbon nanotube layer may exhibit polarization performance in a terahertz frequency range.

Further, the terahertz frequency range may be 0.1~2.0 THz.

Further, the carbon nanotubes wound on the substrate may be filamentary carbon nanotubes.

Further, the substrate may be not formed in a region for allowing the carbon nanotube layer to exhibit polarization performance.

Further, the substrate may be a U-shaped or □-shaped substrate.

Further, the carbon nanotube layer may be wound on the substrate at a speed of 30 m/min.

Further, the carbon nanotube layer may be formed on one side or both sides of the substrate.

Further, the carbon nanotube layer may have a thickness of 4 to 10 μm.

Further, the carbon nanotubes wound on the substrate may be integrated by physical or chemical means.

Further, the carbon nanotube layer may be composed of 150 or more layers, and may have an extinction ratio of 40 dB.

Another aspect of the present invention provides a method of fabricating a carbon nanotube sheet, including the steps of: providing a carbon nanotube forest; deriving filamentary carbon nanotubes from the carbon nanotube forest by bringing the end of a metal pin as a deriving unit into the carbon nanotube forest to generate shear stress; and winding the derived filamentary carbon nanotubes on a substrate to form a carbon nanotube layer composed of 5 or more layers.

Still another aspect of the present invention provides an apparatus for fabricating a carbon nanotube sheet, including: a substrate; a rotating unit for rotating the substrate; and a deriving unit for deriving filamentary carbon nanotubes from a carbon nanotube forest, wherein carbon nanotubes derived by the deriving unit are rotated by the rotating unit.

In the apparatus, the deriving unit may be a metal pin.

Still another aspect of the present invention provides a polarizer, including the carbon nanotube sheet.

Advantageous Effects

The carbon nanotube sheet and polarizer using the same according to the present invention is characterized in that they exhibit excellent polarization performance in a terahertz frequency range by controlling the carbon nanotube layer.

Further, the carbon nanotube sheet and polarizer using the same according to the present invention is advantageous in that they can be fabricated by a simple mechanical apparatus (including manual operation).

Further, the carbon nanotube sheet and polarizer using the same according to the present invention is advantageous in that they can be easily fabricated, and can exhibit a better polarization performance than conventional commercialized polarizers.

REFERENCE NUMERALS

Figure 1:
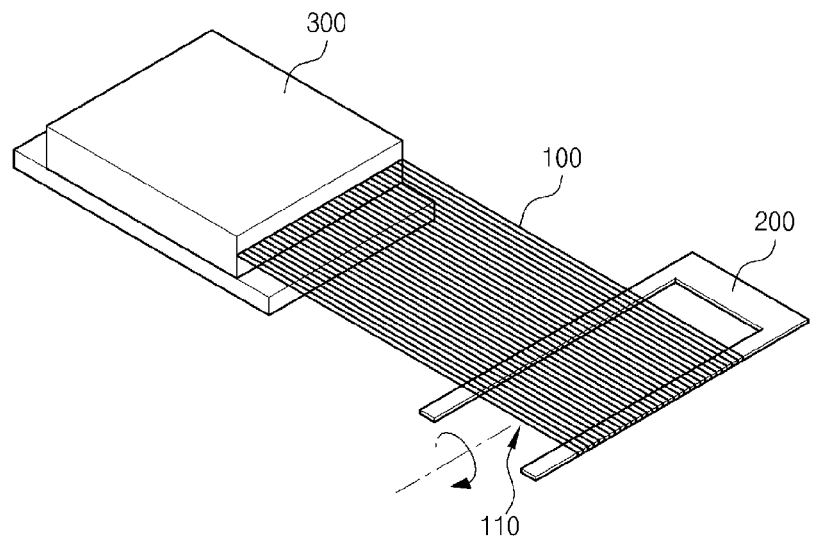
FIG. 1 is a schematic diagram showing a process of fabricating a carbon nanotube sheet according to an embodiment of the present invention.
Figure 2:
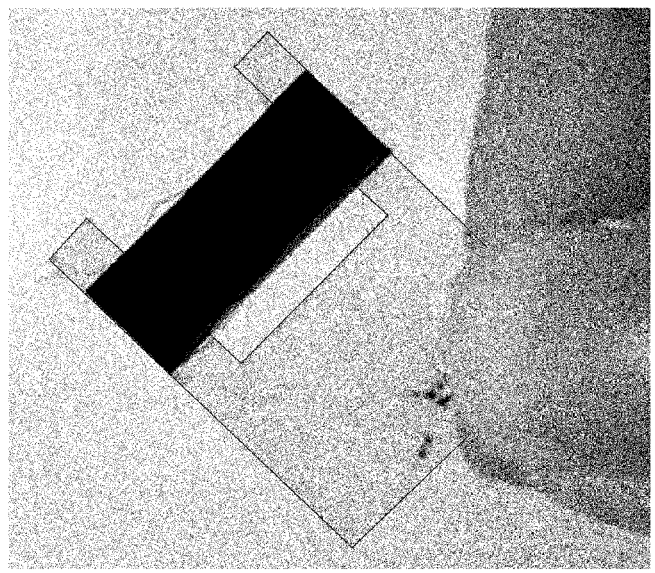
FIG. 2 is a photograph showing a carbon nanotube sheet according to an embodiment of the present invention.
Figure 3:
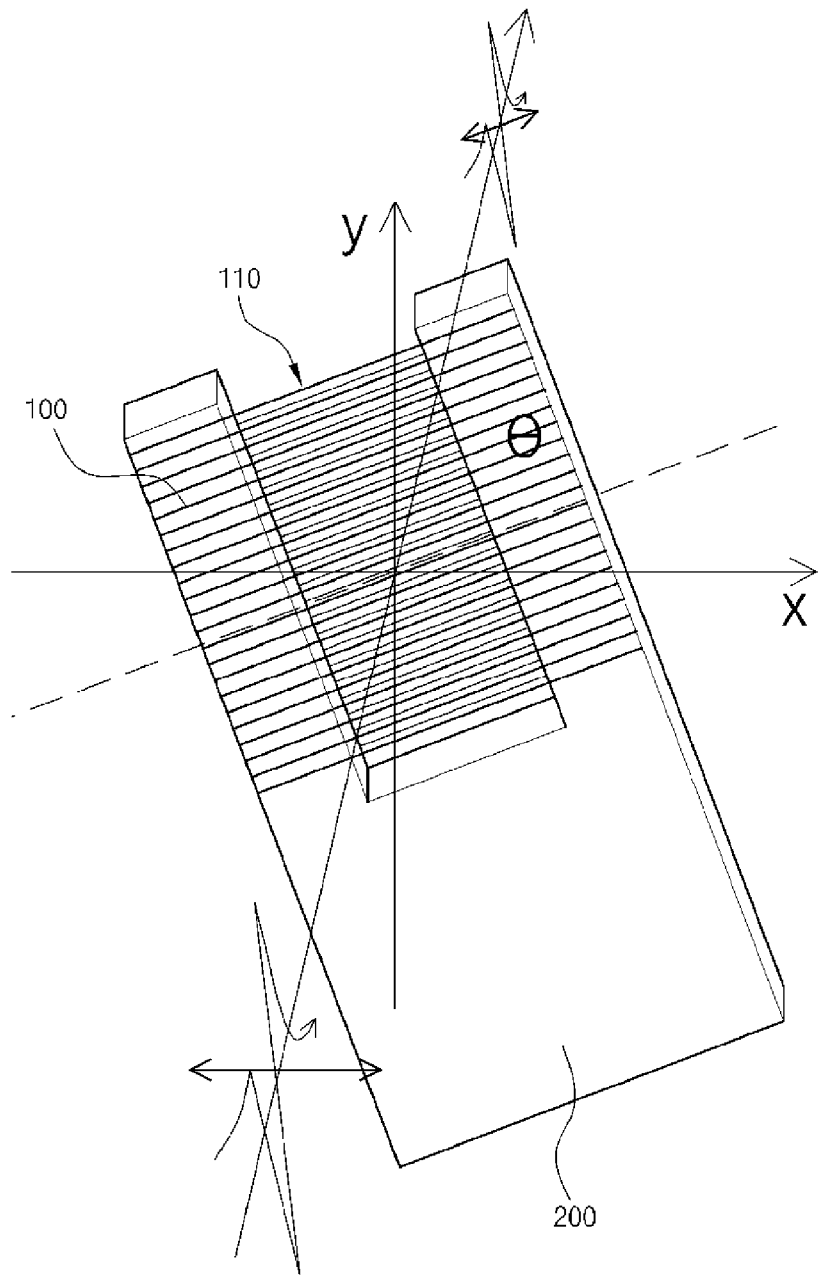
FIG. 3 is a schematic diagram showing an experiment for measuring the polarization state of the carbon nanotube sheets of Examples 1 to 7.

100: carbon nanotubes
110: region
200: substrate
300: carbon nanotube forest

BEST MODE

Hereinafter, preferred embodiments of the present invention will be described in detail with reference to the attached drawings. Throughout the accompanying drawings, the same reference numerals are used to designate the same or similar components, and redundant descriptions thereof are omitted. In the description of the present invention, when it is determined that the detailed description of the related art would obscure the gist of the present invention, the description thereof will be omitted.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The term "sheet" used herein is referred to as a film, web, membrane or the like having predetermined width and thickness.

Further, the term "polarizer" is referred to as an optical device for converting natural light into linear polarized light.

Hereinafter, a process of fabricating a carbon nanotube sheet according to an embodiment of the present invention will be described. Here, carbon nanotubes may be derived from a carbon nanotube forest. Preferably, the carbon nanotubes may be multi-wall carbon nanotubes.

The carbon nanotube forest may be prepared by the method disclosed in Korean Application Publication No. 2010-0072912. Preferably, the carbon nanotube forest may be prepared by chemical vapor deposition (CVD), but is not limited thereto.

Referring to FIG. 1, when a carbon nanotube forest 300 is provided, carbon nanotubes 100 are derived from one side of the carbon nanotube forest 300. Here, as the deriving unit, various kinds of tools, such as a metal pin and the like, may be used. When the end of the metal pin makes contact with the carbon nanotube forest, shear stress is generated, thus deriving filamentary carbon nanotubes from the carbon nanotube forest.

The derived carbon nanotubes 100 are wound on a substrate 200. The substrate 200 may have various shapes. For example, the carbon nanotubes 100 may be wound on a transparent substrate, specifically, a PE or PET film, which is transparent in a visible region. The substrate 200 may be configured such that it is not formed in a region 110 for allowing the wound carbon nanotubes to exhibit polarization performance. For example, the substrate may be a U-shaped or □-shaped substrate.

The size and shape of the substrate 200 are not limited, but, preferably, may be a U-shaped substrate having the region 110 in terms of controlling unnecessary substrate loss or incident wave dispersion. Meanwhile, the size of the carbon nanotube sheet may be determined depending on the length of the substrate 200 in the winding direction. That is, the carbon nanotube sheet according to an embodiment of the present invention is characterized in that it can be fabricated without size limitation.

The carbon nanotubes 100 derived from the carbon nanotube forest 300 can be continuously wound on the substrate 200 by rotating the substrate 200 using a rotation unit (not shown). The rotation unit may be an automatic and/or manual rotation unit. The automatic rotation unit may be a motor.

In the fabrication of the carbon nanotubes 10, the winding speed of the carbon nanotubes 10 on the substrate 200 is not limited to the physical properties of carbon nanotubes or the use of the carbon nanotube sheet. However, in order to stably wind the carbon nanotubes, it is preferred that the winding speed thereof be 5 to 30 m/min.

The winding speed thereof can be determined depending on the mechanical strength of carbon nanotubes. In order to prevent the carbon nanotubes from being cut and to maintain tension, it is preferred that the winding speed thereof be 5 to 30 m/min.

When the substrate 200 rotates in a half revolution, a single carbon nanotube layer is formed on only one side of the substrate 200. That is, the carbon nanotube sheet according to an embodiment of the present invention includes a carbon nanotube layer formed on one side of the substrate 200. Meanwhile, when the substrate 200 rotates in one revolution, carbon nanotube layers are respectively formed on both sides of the substrate 200 to fabricate a two-layer carbon nanotube sheet. The thickness of the carbon nanotube sheet may be determined depending on the number of revolutions. The present inventors found that the carbon nanotube sheet 10 can exhibit polarization properties in various frequency ranges as a polarizer by controlling the thickness thereof.

When the thickness of the carbon nanotube sheet is not suitably controlled, as pattern carbon nanotubes grow, the carbon nanotube sheet cannot be easily reproduced at the time of using an electrical transmission process, and the maximum thickness thereof is limited, which is problematic. Due to this problem, a terahertz (THz) polarizer is accompanied by an electron beam lithography process or an etching process. Even in this case, there is a limitation in controlling the thickness thereof.

The present inventors paid attention to the point at which an independent terahertz polarizer is made, based on a carbon nanotube sheet, and preferably, a multi-wall carbon nanotube sheet can solve the above problem. As described above, the carbon nanotube sheet can maintain its ultra-aligned state by solid-phase extraction, and a polarizer having an excellent extinction ratio in a wide frequency range of 0.1 to 2.0 THz can be realized in the region 110 of the carbon nanotube sheet. Particularly, the polarizer can exhibit an extinction ratio of 40 dB, which is the highest extinction ratio that can be obtained from a wire grid.

The present inventors found that, in order for the carbon nanotube sheet and the polarizer using the same, according to the present invention, to exhibit excellent quenching characteristics in a terahertz (THz) frequency region, the number of carbon nanotube layers must be increased or decreased. Therefore, in order to exhibit a targeted polarization function in the terahertz (THz) frequency region, the number of carbon nanotube layers must be suitably controlled. When the number of carbon nanotube layers is 5 or more, a polarization function can be exhibited in the terahertz (THz) frequency region. The number of carbon nanotube layers may be 5 to 3,000, preferably, 10 to 200. The thickness of the carbon nanotube layer may be 4 to 10 μm. As the number of carbon nanotube layers increases, the polarization function in the low terahertz (THz) frequency region may be advantageous.

Meanwhile, the polarizer using the carbon nanotube sheet may be configured such that the carbon nanotube sheet is composed of a plurality of carbon nanotube layers or the carbon nanotube sheets are laminated.

As the degree of lamination of carbon nanotubes on the carbon nanotube sheet increases, the polarization function of the carbon nanotube sheet is improved. The lamination of the carbon nanotubes may be performed by various methods. For example, the lamination of the carbon nanotubes may be performed by a physical method such as precise winding control or a chemical method such as ethanol supply.

MODE FOR INVENTION

Hereinafter, the present invention will be described in more detail with reference to the following Examples.

EXAMPLE 1

Carbon nanotubes were derived from a multi-wall carbon nanotube forest formed by chemical vapor deposition (CVD) using acetylene gas as a carbon source, and were then wound on a U-shaped PET substrate at a winding speed of 10 m/min to form a carbon nanotube layer. In this case, the carbon nanotube layer was wound on both sides of the substrate by rotating the substrate to form a carbon nanotube sheet composed of 10 carbon nanotube layers.

EXAMPLE 2

The procedures were the same as in Example 1, except that the carbon nanotube layer was wound on both sides of the substrate by rotating the substrate to form a carbon nanotube sheet composed of 25 carbon nanotube layers.

EXAMPLE 3

The procedures were the same as in Example 1, except that the carbon nanotube layer was wound on both sides of the substrate by rotating the substrate to form a carbon nanotube sheet composed of 50 carbon nanotube layers.

EXAMPLE 4

The procedures were the same as in Example 1, except that the carbon nanotube layer was wound on both sides of the substrate by rotating the substrate to form a carbon nanotube sheet composed of 75 carbon nanotube layers.

EXAMPLE 5

The procedures were the same as in Example 1, except that the carbon nanotube layer was wound on both sides of the substrate by rotating the substrate to form a carbon nanotube sheet composed of 100 carbon nanotube layers.

EXAMPLE 6

The procedures were the same as in Example 1, except that the carbon nanotube layer was wound on both sides of the substrate by rotating the substrate to form a carbon nanotube sheet composed of 150 carbon nanotube layers.

EXAMPLE 7

The procedures were the same as in Example 1, except that the carbon nanotube layer was wound on both sides of the substrate by rotating the substrate to form a carbon nanotube sheet composed of 200 carbon nanotube layers.

The polarization performance of the carbon nanotube sheets of Examples 1 to 7 may be evaluated by various methods. Specifically, FIGS. 3 to 9 shows the results evaluated based on the carbon nanotube sheet of Example 4. In order to evaluate the anisotropy of the carbon nanotube sheet of Example 4, terahertz time domain spectroscopy (THz-TDS)

may be used. The polarization direction of incident terahertz waves was fixed to the X axis (parallel to the surface of the Optical Table), and the carbon nanotube sheet was rotated from θ=0° to 360° at 15° intervals in a clockwise direction. When the electric field direction of terahertz waves and the long axis of the carbon nanotube sheet was perpendicular (parallel) to each other, it was expressed as 0° (90°). The transmitted terahertz wave having X-component and Y-component of electric fields were measured using a conventional electro-optic detection method. The electric fields of X-component (Ex) and Y-component (Ey) were each independently measured by rotating the crystal 90° (refer to FIG. 3).

Figure 4:
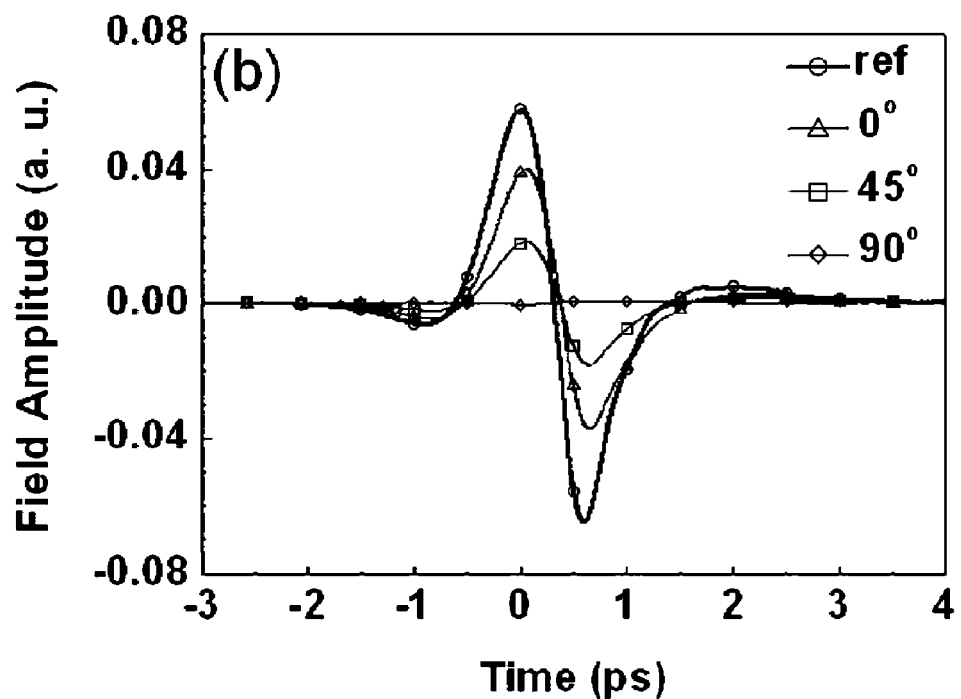
FIG. 4 is a graph showing the electric field amplitude (X component) of the carbon nanotube sheet of Example 4 according to polarization angle.
Figure 5:
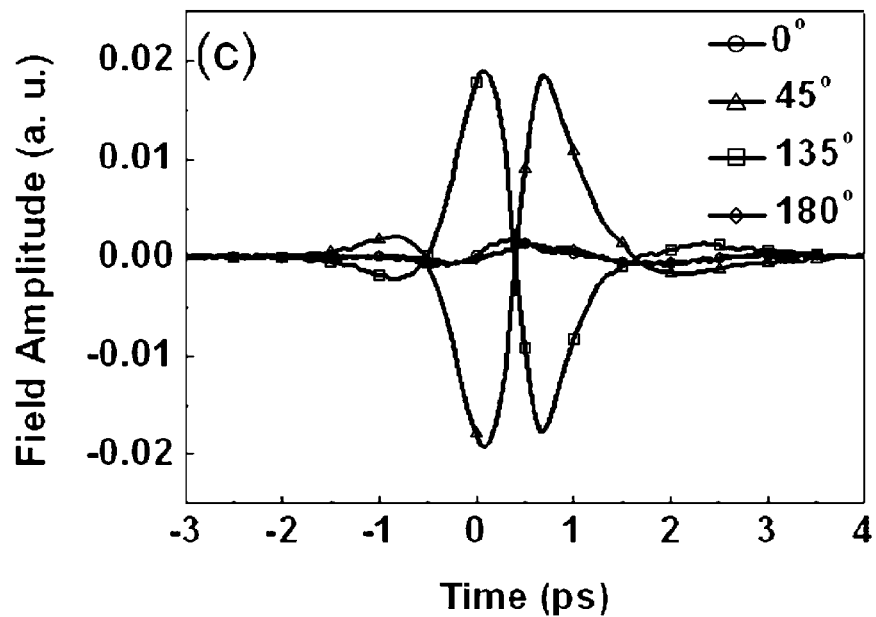
FIG. 5 is a graph showing the electric field amplitude (Y component) of the carbon nanotube sheet of Example 4 according to polarization angle.

FIGS. 4 and 5 represent the angle-dependent transmission of Ex and Ey in the time domain. The black line in FIG. 4 indicates a reference signal without any carbon nanotube sheet. In the case of X component, when the long axis of the carbon nanotube sheet is perpendicular to the electric field of terahertz waves (0° and 180° of FIG. 3), terahertz waves are maximally transmitted. Comparing terahertz waves with incident waves (0°), terahertz waves were somewhat reduced, and signals were also reduced depending on an increase in the polarization angle. Referring to FIG. 4, when the angle between the carbon nanotube sheet and the polarized light of terahertz waves became 90° (270°), transmitted waves were reduced by 100 times or more (based on amplitude) and were completely even. Although the polarization angle was changed, the carbon nanotube sheet of the present invention did not exist in the concerned spectral region, and its shape and normal position did not change.

In contrast, the maximum transmission in the Ey field was measured at four angles of 45°, 135°, 225° (not seen) and 315° (not seen), and phase difference corresponding to 180° occurred when transmission is conducted between 45°, 225° and 135°, 315° (refer to FIG. 5). This phenomenon, which was not observed in the measurement of transmission in the Ex field, can be understood by aligned carbon nanotubes and polarized incident waves.

Figure 6:
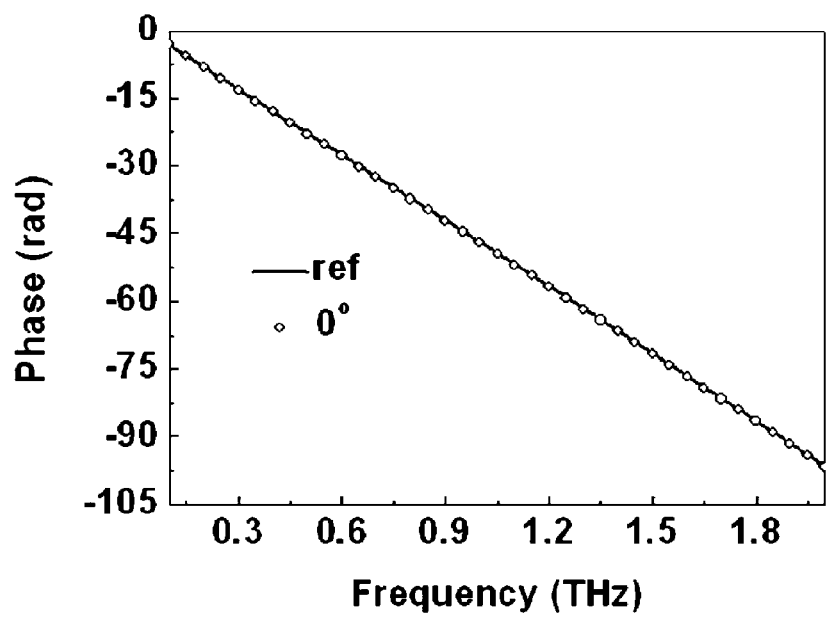
FIG. 6 is a graph showing the phase information for transmission signals through the reference aperture (black line) and the carbon nanotube sheet of Example 4 at 0° (open black circle).

In order to extract the spectrum features of the carbon nanotube sheet according to an embodiment of the present invention, Fourier transform of the time domain signals was applied. FIG. 6 shows the phase information of the reference signal (without carbon nanotube sheet, black line) and the transmitted Ex field at 0° (open black circle). Clearly, there was no measurable phase difference (Δφ) between the two data implying our CNT sheet.

Figure 7:
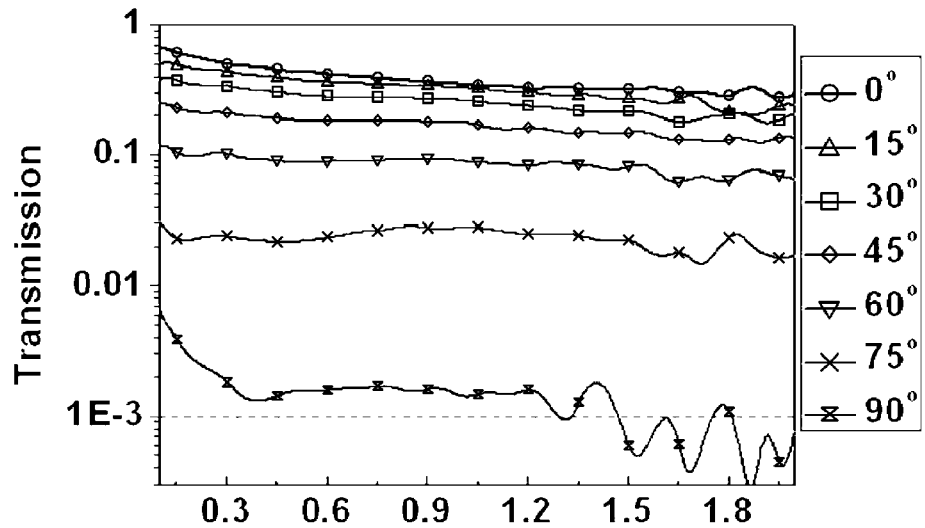
FIG. 7 is a graph showing the transmission spectrum of the carbon nanotube sheet of Example 4 according to a polarization angle.

FIG. 7 shows the angle-dependent transmission, defined by $T(\theta)=\sqrt{E_x^2+E_y^2}$, as a function of frequency of 0.1 to 2.0 THz for different polarization angles from θ=0° to 90°. The average transmission at 0° is over 50% while 4 orders of magnitude annihilation was observed at 90°. Since transmission through an ideal polarizer follows Malus's law ($T(\theta)=T(0)\cos^2\theta$), it is worthwhile to verify how well our measured data, $T(\theta)$, fits a $\cos^2\theta$ dependence.

Figure 8:
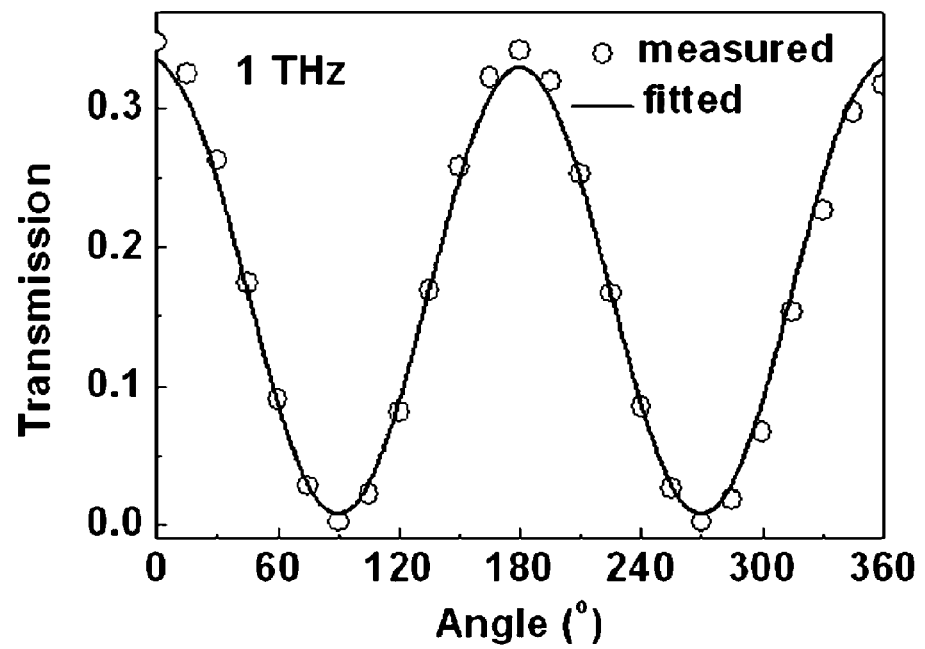
FIG. 8 is a graph showing the transmission spectrum as a function of polarization angle θ at 1 THz and corresponding fitting curve to $\cos^2 \theta$ (from Malus's law) with respect to the carbon nanotube sheet of Example 4.

FIG. 8 shows the transmission intensity $T(\theta)$ of a polarizer at angle θ, measured under the conditions that the proportional constant A obtained from nonlinear least square algorithm is about 0.33718 and the frequency corresponding A $\cos^2\theta$ is 1.0 terahertz. From FIG. 8, it can be ascertained that the carbon nanotube sheet of the present invention can exhibit an excellent function as a polarizer.

In order to ascertain whether the carbon nanotube sheet exhibits a function as a polarizer in the wide spectral range, DOP Degree of Polarization), which is one of other factors showing the characteristics of a polarizer, was measured. DOP is represented by Math Formula 1 below.

$$DOP = \frac{T_{max} - T_{min}}{T_{max} + T_{min}} \quad \text{[Math Formula 1]}$$

Figure 9:
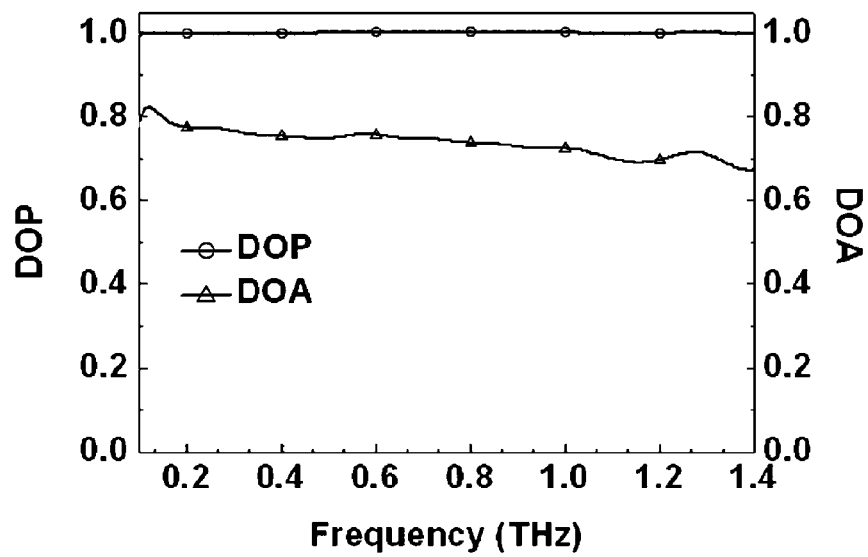
FIG. 9 is a graph showing the degree of polarization (DOP) of the carbon nanotube sheet of Example 4 in the spectral range thereof.

Here, $T_{max}$ and $T_{min}$ are the maximum and minimum light transmission intensities of a linear polarizer over the entire angle range of 360°, respectively. Since an ideal polarizer creates a perfect polarized state, its DOP is 1. In these Examples and Experimental Example, $T_{min}$ may be T(90°), and $T_{max}$ may be T(0°). FIG. 9 shows the degree of polarization (DOP) of the carbon nanotube sheet according to an embodiment of the present invention. From FIG. 9, it can be seen that DOP is maintained over the spectral range.

Figure 10:
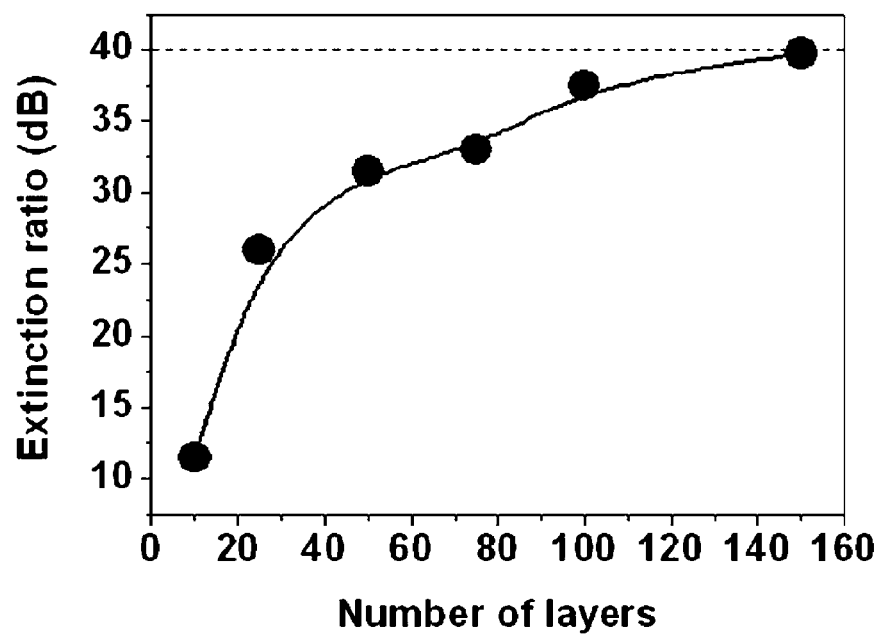
FIG. 10 is a graph showing the extinction ratios of the carbon nanotube sheets of Examples 1 to 7 according to the number of layers.
Figure 11:
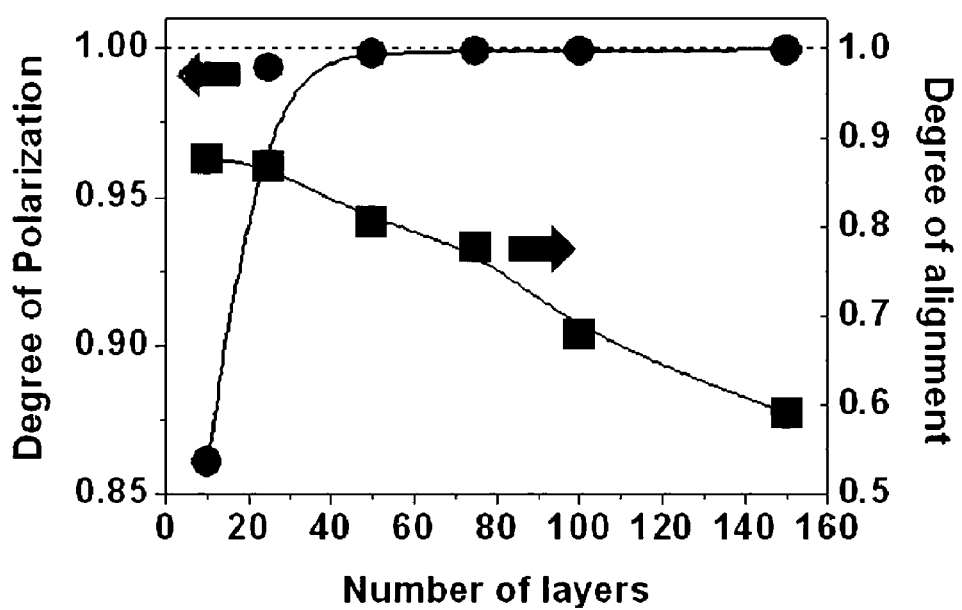
FIG. 11 is a graph showing the degree of polarization (DOP) of the carbon nanotube sheets of Examples 1 to 7 according to the number of layers.

FIGS. 10 and 11 show the influences of the laminated structure of the carbon nanotube sheet on polarization performance. That is, FIGS. 10 and 11 show the two important physical factors of a polarizer, that is, the extinction ratio (−10 log 10 ($T_{max}/T_{min}$)) and degree of polarization (DOP) of the carbon nanotube sheets of Examples 1 to 7. The extinction ratio and DOP of each of the carbon nanotube sheets are approximately equal to the average extinction ratio and DOP of all of the carbon nanotube sheets. As shown in FIG. 10, the extinction ratio is proportional to the number of layers. The extinction ratio of the thick carbon nanotube sheet of Example 7 is 40 dB, which is approximately equal to that of a wire grid or a liquid crystal polarizer.

FIG. 11 shows the average DOP of the carbon nanotube sheet as a function of the number of layers. From FIG. 11, it can be seen that the DOP of the carbon nanotube sheet increases with the increase in the number of layers. When the number of layers is 50 or more, the DOP thereof is 0.999 or more. Thus, it is determined that the polarizer of the present invention is approximately ideal.

The carbon nanotube sheet and the polarizer using the same according to an embodiment of the present invention exhibited physical properties equivalent to those of a wire grid in the terahertz frequency region. Therefore, the carbon nanotube sheet and polarizer according to the present invention can be used in various applications such as bio-sample imaging, terahertz polarization, millimeter wave elliptical polarization reflection measurement, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A carbon nanotube sheet, comprising:
   a substrate having at least two sides; and
   at least a plurality of carbon nanotube layers, each layer being derived from a carbon nanotube forest and comprising carbon nanotubes wound on said at least two sides of the substrate by rotation of the substrate about a winding axis a number of times to establish a thickness of the carbon nanotube sheet,
   wherein the carbon nanotube sheet is composed of 5 or more layers, and
   wherein the layer consists of filamentary carbon nanotubes which are parallel to each other with a same separation distance and are wound orthogonal to an axis of rotation.

2. The carbon nanotube sheet of claim 1, wherein the carbon nanotube sheet is composed of 5 to 3,000 layers.

3. The carbon nanotube sheet of claim 2, wherein the carbon nanotube sheet is composed of 10 to 200 layers.

4. The carbon nanotube sheet of claim 1, wherein the carbon nanotube sheet exhibits polarization performance in a terahertz frequency range.

5. The carbon nanotube sheet of claim 4, wherein the terahertz frequency range is 0.1~2.0 THz.

6. The carbon nanotube sheet of claim 1, wherein the carbon nanotubes wound on the substrate are filamentary carbon nanotubes.

7. The carbon nanotube sheet of claim 1, wherein the substrate is not formed in a region for allowing the carbon nanotube sheet to exhibit polarization performance.

8. The carbon nanotube sheet of claim 7, wherein the substrate is a U-shaped or square or box shaped substrate.

9. The carbon nanotube sheet of claim 1, wherein the carbon nanotube layer is wound on the substrate at a speed of 30 m/min.

10. The carbon nanotube sheet of claim 1, wherein the carbon nanotube layer has a thickness of 4 to 10 μm.

11. The carbon nanotube sheet of claim 1, wherein the carbon nanotubes wound on the substrate are integrated by physical or chemical means.

12. The carbon nanotube sheet of claim 1, wherein the carbon nanotube sheet is composed of 150 or more layers, and has an extinction ratio of 40 dB.

13. A polarizer, comprising the carbon nanotube sheet of claim 1.

14. A carbon nanotube sheet as in claim 1 wherein the substrate sides are planar.

15. A carbon nanotube sheet as in claim 1 wherein the substrate has two parallel planar sides.

16. A carbon nanotube sheet as in claim 1 wherein the substrate is U-shaped to enhance polarization performance.

17. A method of fabricating a carbon nanotube sheet, comprising the steps of:
providing a carbon nanotube forest;
deriving filamentary carbon nanotubes from the carbon nanotube forest by bringing the end of a metal pin as a deriving unit into the carbon nanotube forest to generate shear stress; and
winding the derived filamentary carbon nanotubes on a substrate by rotation of the substrate to form a carbon nanotube layer composed of 5 or more layers,
wherein filamentary carbon nanotubes are parallel each other with the same separation distance, and are wound orthogonal to a rotation axis.

18. A polarizer, comprising the carbon nanotube sheet fabricated by the method of claim 17.

* * * * *